(12) United States Patent
He et al.

(10) Patent No.: US 11,811,591 B2
(45) Date of Patent: Nov. 7, 2023

(54) METHOD AND APPARATUS FOR NETWORK COMMUNICATION

(71) Applicant: Telefonaktiebolaget LM Ericsson (publ), Stockholm (SE)

(72) Inventors: Jiang He, Beijing (CN); Zhenning Zhao, Beijing (CN); Bolin Nie, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/614,069

(22) PCT Filed: May 31, 2019

(86) PCT No.: PCT/CN2019/089573
§ 371 (c)(1),
(2) Date: Nov. 24, 2021

(87) PCT Pub. No.: WO2020/237639
PCT Pub. Date: Dec. 3, 2020

(65) Prior Publication Data
US 2022/0231906 A1    Jul. 21, 2022

(51) Int. Cl.
*G06F 15/173* (2006.01)
*H04L 41/0668* (2022.01)
(Continued)

(52) U.S. Cl.
CPC ........ *H04L 41/0668* (2013.01); *H04L 12/462* (2013.01); *H04L 43/0805* (2013.01); *H04L 43/10* (2013.01)

(58) Field of Classification Search
CPC ............... H04L 41/0668; H04L 12/462; H04L 43/0805; H04L 43/10
(Continued)

(56) References Cited

U.S. PATENT DOCUMENTS

| 10,164,876 B2 | 12/2018 | Kanjariya et al. |
| 2019/0296966 A1 | 9/2019 | Gao et al. |
| 2020/0244485 A1 | 7/2020 | Gao et al. |

FOREIGN PATENT DOCUMENTS

| CN | 101931520 A | 12/2010 |
| CN | 105791072 A | 7/2016 |

(Continued)

OTHER PUBLICATIONS

International Telecommunication Union, "Ethernet ring protection switching", Series G: Transmission Systems and Media, Digital Systems and Networks; Packet over Transport aspects—Ethernet over Transport aspects; Series Y: Global Information Infrastructure, Internet Protocol Aspects and Next-Generation Networks; Internet protocol aspects—Transport, Aug. 2015, pp. 1-82, G.8032/Y.1344, Telecommunication Standardization Sector of ITU.

(Continued)

*Primary Examiner* — Karen C Tang
(74) *Attorney, Agent, or Firm* — COATS & BENNETT, PLLC (57) ABSTRACT

Embodiments of the present disclosure provide methods and apparatuses for network communication. A method comprises determining a link between an edge device of a second network and the first edge device of the first network is failed or the edge device of the second network is failed or an identifier of an Ethernet segment corresponding to the edge device of the second network has been changed; and advertising a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of (Continued)

the second network to the corresponding substitution Ethernet segment of the second network.

13 Claims, 8 Drawing Sheets

(51) Int. Cl.
*H04L 12/46* (2006.01)
*H04L 43/0805* (2022.01)
*H04L 43/10* (2022.01)
*G06F 15/16* (2006.01)

(58) Field of Classification Search
USPC .......................................................... 709/224
See application file for complete search history.

(56) References Cited

FOREIGN PATENT DOCUMENTS

| CN | 108574614 A | 9/2018 |
| CN | 109246005 A | 1/2019 |
| CN | 109672619 A | 4/2019 |

OTHER PUBLICATIONS

Sajassi, A. et al., "BGP MPLS-Based Ethernet VPN", Internet Engineering Task Force (IETF), Request for Comments: 7432; Category: Standards Track, Feb. 2015, pp. 1-56.

PE5: No MAC table update accordingly.
Traffic recovery depends on MAC entries aging out or refresh.

Determining a link between an edge device of a second network and the first edge device of the first network is failed or the edge device of the second network is failed or an identifier of an Ethernet segment corresponding to the edge device of the second network has been changed

404

Advertising a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of the second network to the corresponding substitution Ethernet segment of the second network

602
Determining the link is recovered or the edge device of the second network is recovered

604
Advertising a second message including reachability of the Ethernet segment corresponding to the edge device of the second network and the corresponding substitution Ethernet segment of the second network, wherein the corresponding substitution Ethernet segment of the second network can be used by one or more other edge devices of the first network to switch routes that have been previously switched to the corresponding substitution Ethernet segment of the second network back to the Ethernet segment corresponding to the edge device of the second network

702
Receiving a first message including withdrawal of an Ethernet segment corresponding to an edge device of a second network and a corresponding substitution Ethernet segment of the second network

704
Updating routes associated with the Ethernet segment corresponding to the edge device of the second network based on the first message

Receiving a second message including reachability of the Ethernet segment corresponding to the edge device of the second network and the corresponding substitution Ethernet segment of the second network

904

Updating routes associated with the corresponding substitution Ethernet segment of the second network based on the second message

METHOD AND APPARATUS FOR NETWORK COMMUNICATION

TECHNICAL FIELD

The non-limiting and exemplary embodiments of the present disclosure generally relate to the technical field of communications, and specifically to methods and apparatuses for network communication.

BACKGROUND

This section introduces aspects that may facilitate a better understanding of the disclosure. Accordingly, the statements of this section are to be read in this light and are not to be understood as admissions about what is in the prior art or what is not in the prior art.

An Ethernet Virtual Private Network (EVPN) scenario may comprise customer edge devices (CEs) that are connected to one or more provider edge devices (PEs) that form the edge of a network infrastructure such as multiple protocol label switching (MPLS) label switched path (LSP) infrastructure. A CE may be for example a host, a router, or a switch. The PEs may provide virtual Layer 2 bridged connectivity between the CEs. For example, the PEs may be connected by the MPLS LSP infrastructure, which provides the benefits of MPLS technology, such as fast reroute, resiliency, etc.

EVPN may be a Border Gateway Protocol (BGP) based layer 2 Virtual Private Network (L2VPN) solution for example as defined in Request for Comments (RFC) 7432, the disclosure of which is incorporated by reference herein in its entirety. EVPN routes' reachability/withdrawal may be advertised through BGP among EVPN PEs. Traffic can be forwarded using Media Access Control (MAC)-based or MPLS-based disposition models.

Ethernet ring protection (ERP) switching has been defined in International Telecommunication Union Telecommunication Standardization Sector (ITU-T) G.8032/Y.1344, the disclosure of which is incorporated by reference herein in its entirety. The ERP switching may support revertive switching and non-revertive switching. In the revertive operation, when a failure is recovered, a traffic channel resumes the use of the recovered ring link only after the traffic channel has been blocked on a Ring Protection Link (RPL). On the other hand, in the non-revertive operation, the traffic channel remains blocked on the recovered ring link and unblocked on the RPL even if the failure is recovered.

Figure 1:
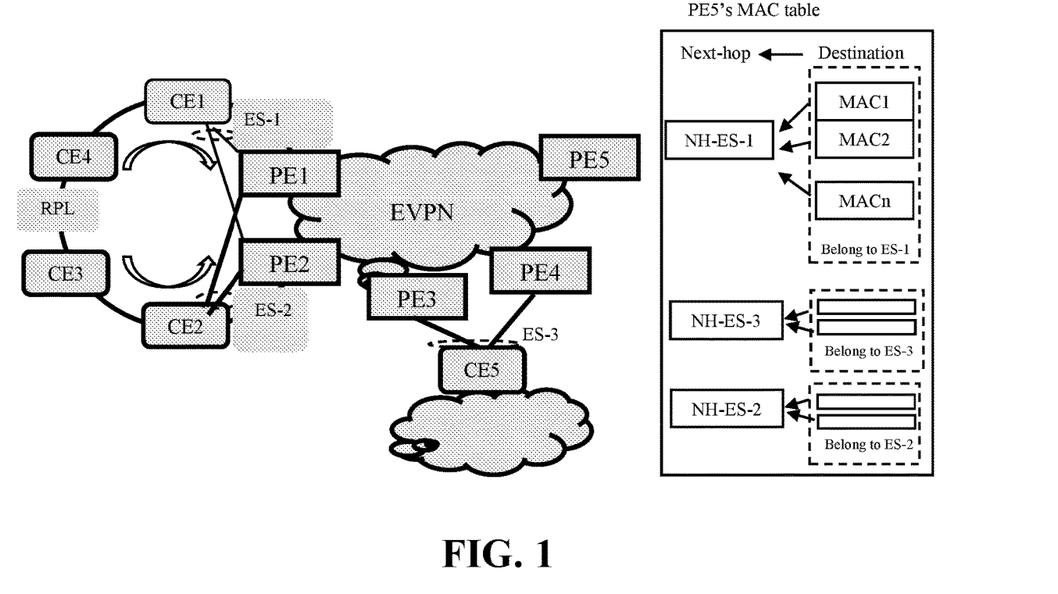
FIG. 1 schematically shows a network of EVPN interworking with ERP according to an embodiment.

FIG. 1 schematically shows a network of EVPN interworking with ERP according to an embodiment. For example, the EVPN interworking with ERP may be used in mobile backhaul networks. As shown in FIG. 1, there are three Ethernet segments ES-1, ES-2 and ES-3. The Ethernet segment may use any suitable Ethernet technologies such as the ERP switching technology. When a customer site (such as device or network) is connected to one or more PEs via a set of Ethernet links, then that set of links may be referred to as an Ethernet segment. Each Ethernet segment may be identified by an Ethernet Segment Identifier (ESI) which is a unique non-zero identifier. For example CE1 is connected to PE1 and PE2 via two links and these links may be referred to as an Ethernet segment for example identified by ES-1. In addition, ESI may have multiple types such as Types 0, 1, 2, 3, 4 and 5 as described in RFC 7432. ESI changes can happen during running time due to various reasons as described in RFC 7432. It is noted that the number of the PEs in the EVPN and the number of the CEs in each Ethernet segment are only for the purpose of illustration, there may be any suitable number of PEs and CEs in other embodiments.

Figure 2:
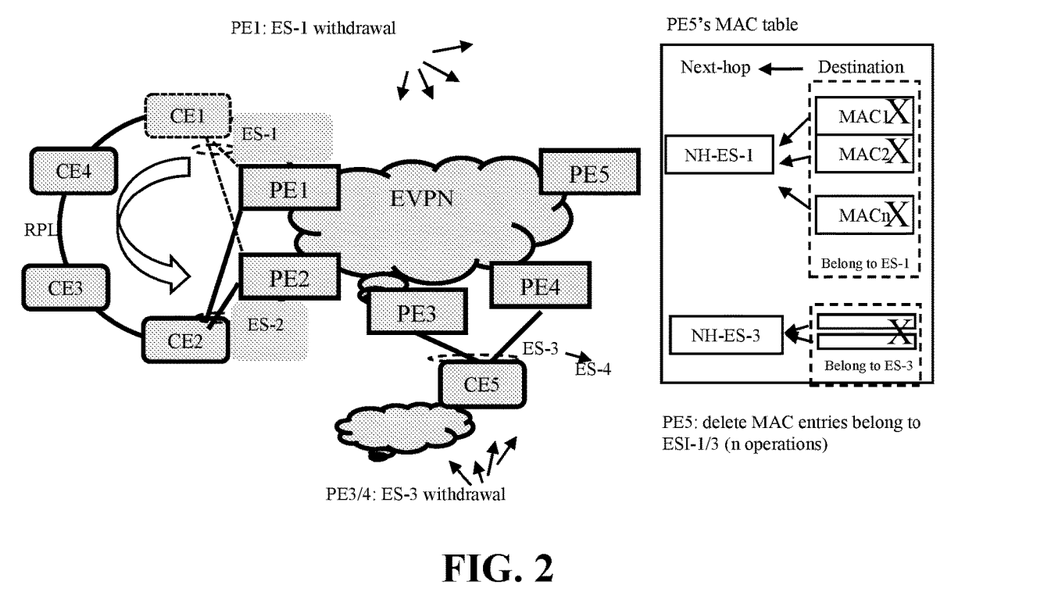
FIG. 2 schematically shows a network of EVPN interworking with ERP according to another embodiment.

FIG. 2 schematically shows a network of EVPN interworking with ERP according to another embodiment. In this embodiment, the links between CE1 and PE1, PE2 are failed or CE1 is failed. In addition, ES-3 has been changed to ES-4 for example due to customer site's Link Aggregation Control Protocol (LACP) parameter or topology update. When CE1 node is failed or the links between CE1 and PE1, PE2 are failed, PE1 and PE2 may advertise Ethernet A-D route per ES, to withdraw ES-1, to all other PEs such as PE5 to invalidate the MAC entries for the ES-1 segment. In case CE1 is single-homed to PE1, with such failure, PE1 may advertise MAC/IP routes withdrawal to all other PEs. Other PEs, such as PE5, invalidates the MAC entries accordingly. When ES-3 has been changed to ES-4. PE3 and PE4 may advertise Ethernet A-D route per ES, to withdraw the original ES-3, which triggers other PEs such as PE5 to invalidate the MAC entries for that segment.

Figure 3:
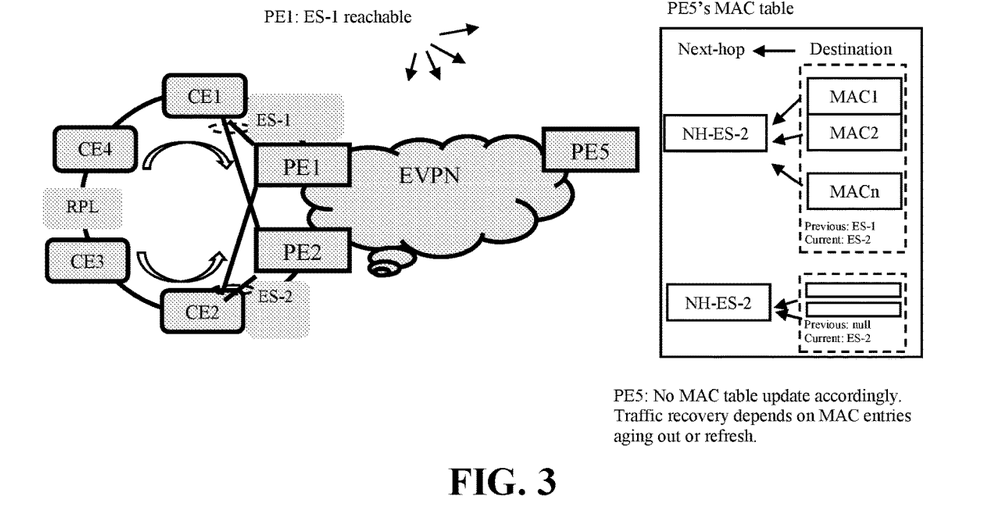
FIG. 3 schematically shows a network of EVPN interworking with ERP according to another embodiment.

FIG. 3 schematically shows a network of EVPN interworking with ERP according to another embodiment. In this embodiment, the links between CE1 and PE1, PE2 are recovered or CE1 is recovered. When the links between CE1 and PE1, PE2 are recovered or CE1 is recovered, Ethernet ring topology is switchover back in case of the revertive mode and PE1 and PE2 advertise Ethernet A-D route per ES, to advertise ES-1 is now reachable to all other PEs.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems with the existing EVPN interworking with ERP. For example, as shown in FIG. 2, when the links between CE1 and PE1, PE2 are failed or the CE1 is failed or ES-3 has been changed to ES-4, MAC entry invalidation triggered by ES withdrawal may introduce traffic slow convergence, that is, traffic interruption and consequent congestion. For example, before MAC entry removal, traffic may be sent to a wrong destination in case of EVPN multi-homing with MPLS-based disposition or EVPN single-homing, which causes traffic interruption. After MAC entries are removed till MAC entries are relearnt, traffic is flooded, which may cause traffic congestion. In case the CE is single-homed to the PE, traffic interruption duration may increase much, because of advertising many MAC/IP routes withdrawal rather than one ES withdrawal. For highly scaled environments, this problem may become worse.

When the links between the CE1 and the PE1, PE2 are recovered or the CE1 is recovered as shown in FIG. 3, in case the CE is single-homed to the PE, Ethernet ring topology is switchover back in case of the revertive mode, but there is no EVPN Ethernet A-D route per ES advertisement on PE1. Other PEs such as PE5 still forwards traffic to ES-2 till MAC entry aged out or refreshed. In addition, no matter multi-homed or single-homed, the ERP revertive switchover expects MAC entries on remote PEs to revert accordingly. But there are no such activities happened on remote PEs. For EVPN multi-homing or EVPN single-homing with MPLS-based disposition, traffic is interrupted. Traffic recovery depends on MAC entry aging out or refresh, usually about several minutes. For highly scaled environments, this problem may become worse.

To overcome or mitigate at least one above mentioned problems or other problems or provide a useful solution, the embodiments of the present disclosure propose an improved network communication solution. In an embodiment, PE may advertise the relationship of ES withdrawal and its ES substitution. In case CE is single-homed to PE, ES and its substitution are also configured. When ES withdrawal is received by other PEs, this may trigger other PEs, if there are no other aliasing/backup paths towards that ES, to update next-hop adjacencies for all MAC entries associated with that ES, to the ES substitution accordingly, instead of invalidating all the MAC entries for that ES. Thus, traffic fast convergence is reached. In another embodiment, when PE advertises ES reachability and wants to take back traffic from another ES, the ES substitution information is attached. In case CE is single-homed to the PE, ES and its substitution information are also configured. This may trigger other PEs to update next-hop adjacencies for all MAC entries which have been previously switched from the ES to another ES, reverting to the ones of the ES again, instead of waiting for MAC entries aging out or refresh. Thus, traffic fast convergence is reached.

In a first aspect of the disclosure, there is provided a method at a first edge device of a first network. The method comprises determining a link between an edge device of a second network and the first edge device of the first network is failed or the edge device of the second network is failed or an identifier of an Ethernet segment corresponding to the edge device of the second network has been changed; and advertising a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of the second network to the corresponding substitution Ethernet segment of the second network.

In an embodiment, the edge device of the second network may be connected to one or more edge devices of the first network via a set of links.

In an embodiment, the method according to the first aspect of the disclosure may further comprise determining all links of the set of links are failed.

In an embodiment, the first message may further include a relationship of the Ethernet segment corresponding to the edge device of the second network and the corresponding substitution Ethernet segment of the second network.

In an embodiment, the method according to the first aspect of the disclosure may further comprise determining the link is recovered or the edge device of the second network is recovered; and advertising a second message including reachability of the Ethernet segment corresponding to the edge device of the second network and the corresponding substitution Ethernet segment of the second network, wherein the corresponding substitution Ethernet segment of the second network can be used by one or more other edge devices of the first network to switch routes that have been previously switched to the corresponding substitution Ethernet segment of the second network back to the Ethernet segment corresponding to the edge device of the second network.

In an embodiment, the second message may further include a relationship of the Ethernet segment corresponding to the edge device of the second network and the corresponding substitution Ethernet segment of the second network.

In an embodiment, the corresponding substitution Ethernet segment of the second network may be configured in the first edge device of the first network or derived by the first edge device of the first network.

In an embodiment, the corresponding substitution Ethernet segment of the second network may be encoded in a Border Gateway Protocol (BGP) path attribute or an extended community.

In an embodiment, the first network may be an Ethernet virtual private network and the second network may be an Ethernet network.

In an embodiment, the Ethernet network may use Ethernet Ring Protection (ERP) control process.

In an embodiment, the Ethernet ring may be operated in a revertive mode.

In an embodiment, the identifier of an Ethernet segment of the second network may be an Ethernet segment identifier (ESI).

In a second aspect of the disclosure, there is provided a method at a second edge device of a first network. The method comprises receiving a first message including withdrawal of an Ethernet segment corresponding to an edge device of a second network and a corresponding substitution Ethernet segment of the second network; and updating routes associated with the Ethernet segment corresponding to the edge device of the second network based on the first message.

In an embodiment, updating routes associated with the Ethernet segment corresponding to the edge device of the second network based on the first message comprises when there is no an aliasing/backup path towards the Ethernet segment corresponding to the edge device of the second network, switching the routes associated with the Ethernet segment corresponding to the edge device of the second network to the corresponding substitution Ethernet segment of the second network.

In an embodiment, the first message further includes a relationship of the Ethernet segment corresponding to the edge device of the second network and the corresponding substitution Ethernet segment of the second network.

In an embodiment, the method according to the second aspect of the disclosure may further comprise receiving a second message including reachability of the Ethernet segment corresponding to the edge device of the second network and the corresponding substitution Ethernet segment of the second network; and updating routes associated with the corresponding substitution Ethernet segment of the second network based on the second message.

In an embodiment, updating routes associated with the corresponding substitution Ethernet segment of the second network based on the second message may comprise switching routes that have been previously switched to the corresponding substitution Ethernet segment of the second network back to the Ethernet segment corresponding to the edge device of the second network.

In an embodiment, the second message may further include a relationship of the Ethernet segment corresponding to the edge device of the second network and the corresponding substitution Ethernet segment of the second network.

In a third aspect of the disclosure, there is provided an apparatus implemented at a first edge device of a first network. The apparatus may comprise a processor; and a memory coupled to the processor. Said memory containing instructions executable by said processor, whereby said apparatus is operative to determine a link between an edge device of a second network and the first edge device of the first network is failed or the edge device of the second network is failed or an identifier of the Ethernet segment corresponding to the edge device of the second network has been changed; and advertise a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of the second network to the corresponding substitution Ethernet segment of the second network.

In a fourth aspect of the disclosure, there is provided an apparatus implemented at a second edge device of a first network. The apparatus may comprise a processor; and a memory coupled to the processor. Said memory containing instructions executable by said processor, whereby said apparatus is operative to receive a first message including withdrawal of an Ethernet segment corresponding to the edge device of a second network and a corresponding substitution Ethernet segment of the second network; and update routes associated with the Ethernet segment of the second network based on the first message.

In a fifth aspect of the disclosure, there is provided a computer program product, comprising instructions which, when executed on at least one processor, cause the at least one processor to carry out the method according to the first aspect of the disclosure.

In a sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

In a ninth aspect of the disclosure, there is provided an apparatus implemented at a first edge device of a first network. The apparatus may comprise a first determining unit configured to determine a link between an edge device of a second network and the first edge device of the first network is failed or the edge device of the second network is failed or an identifier of an Ethernet segment corresponding to the edge device of the second network has been changed; and a first advertising unit configured to advertise a first message including withdrawal of the Ethernet segment corresponding to the edge device of the second network and a corresponding substitution Ethernet segment of the second network. The corresponding substitution Ethernet segment of the second network can be used by one or more other edge devices of the first network receiving the first message to switch routes associated with the Ethernet segment corresponding to the edge device of the second network to the corresponding substitution Ethernet segment of the second network.

In a tenth aspect of the disclosure, there is provided an apparatus implemented at a second edge device of a first network. The apparatus may comprise a first receiving unit configured to receive a first message including withdrawal of an Ethernet segment corresponding to an edge device of a second network and a corresponding substitution Ethernet segment of the second network; and a first updating unit configured to update routes associated with the Ethernet segment corresponding to the edge device of the second network based on the first message.

The proposed solution according to some embodiments may have the following advantages such as incremental deployment, traffic fast convergence and low cost, etc.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

While this and other embodiments below are primarily discussed in the context of the network of EVPN interworking with ERP as shown in FIG. 1, it will be recognized by those of ordinary skill that the disclosure is not so limited. In fact, the various aspects of this disclosure are useful in any network/system that can benefit from the embodiments as is described herein.

Figure 4:
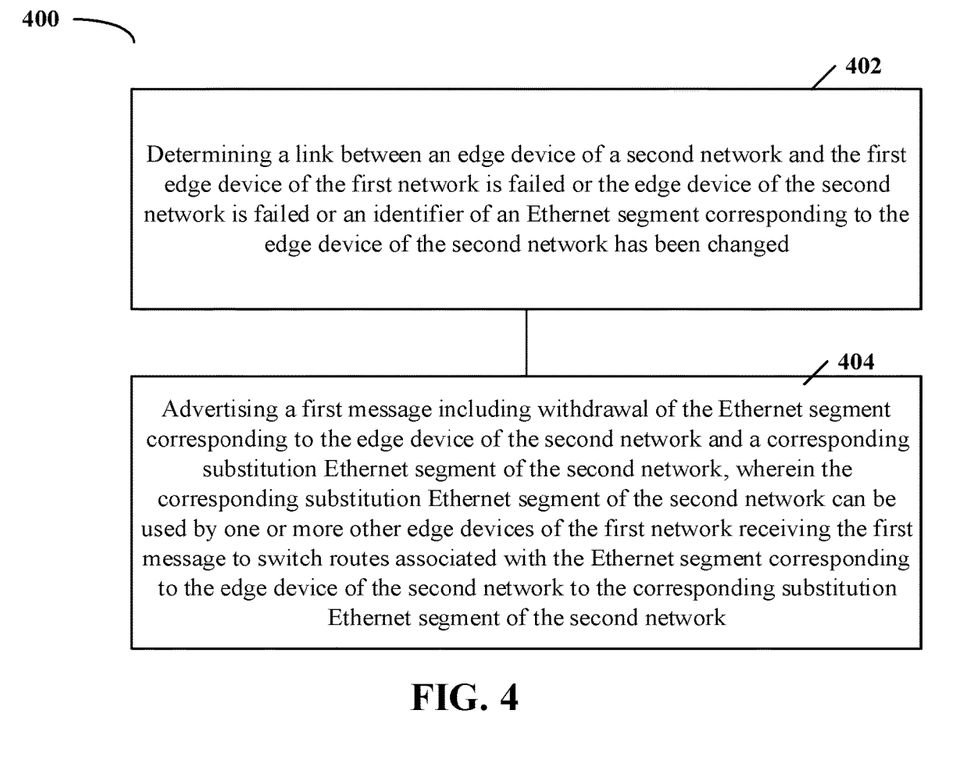
FIG. 4 shows a flowchart of a method according to an embodiment of the present disclosure.

FIG. 4 shows a flowchart of a method 400 according to an embodiment of the present disclosure, which may be implemented at a first edge device of a first network such as PE device of EVPN as shown in FIG. 1. As such, the first edge device may provide means for accomplishing various parts of the method 400 as well as means for accomplishing other processes in conjunction with other components.

At block 402, the first edge device determines a link between an edge device of a second network and the first edge device of the first network is failed or the edge device of the second network is failed or an identifier of an Ethernet segment corresponding to the edge device of the second network has been changed. The second network may be an Ethernet network. The first network may be any suitable network which can provide tunneling for the second network to interconnect two or more Ethernet segments of the second network. For example, the first network may be EVPN as described in RFC 7432. The nodes of the first network may be connected by various label switched infrastructures. For example, in EVPN, the PEs may be connected by the MPLS LSP infrastructure. The identifier of an Ethernet segment of the second network may be identified by a unique non-zero identifier. For example, in EVPN, the identifier of an Ethernet segment of the second network may be identified by an ESI.

The first edge device such as PE may determine the link failure or the edge device failure of the second network in various ways. For example, these failures can be detected by using a heartbeat message or other message. The edge device such as CE of the second network can notify the link or edge device failure event to first edge device such as PE in advance for example when the edge device such as CE of the second network is planned to be upgraded or maintained. Another network device such as another PE may notify the edge device failure of the second network to the first edge device when it has detected this failure.

The identifier of an Ethernet segment corresponding to the edge device of the second network may be changed due to various reasons. For example, the identifier may be auto-generated based on any suitable network parameters. In addition, the identifier may be configured by an operator. When at least one of the network parameters are changed or the operator wants to change the identifier, the identifier may be changed. For example, ESI may have multiple types such as Types 0, 1, 2, 3, 4 and 5 and ESI changes can happen during running time due to various reasons as described in RFC 7432.

At block 404, the first edge device advertises a first message including withdrawal of the Ethernet segment corresponding to the edge device of the second network and a corresponding substitution Ethernet segment of the second network. The first edge device may determine the corresponding substitution Ethernet segment of the second network in various ways. For example, the corresponding substitution Ethernet segment of the second network may be preconfigured in the first edge device. As shown in FIG. 1, the corresponding substitution Ethernet segment for ES-1 may be configured as ES-2, and the corresponding substitution Ethernet segment for ES-2 may be configured as ES-1. As another example, the first edge device may obtain the corresponding substitution Ethernet segment of the second network from another network device such as an operations administration and maintenance (OAM) system. As still another example, the first edge device may derive the corresponding substitution Ethernet segment of the second network. For example, when the identifier of the Ethernet segment corresponding to the edge device of the second network has been changed to another Ethernet segment identifier, the first edge device may determine the corresponding substitution Ethernet segment of the second network as said another Ethernet segment identifier.

The corresponding substitution Ethernet segment of the second network can be used by one or more other edge devices of the first network receiving the first message to switch routes associated with the Ethernet segment corresponding to the edge device of the second network to the corresponding substitution Ethernet segment of the second network. For example, as described in FIG. 2, when CE1 node is failed or all links between CE1 and PE1, PE2 are failed, PE1 and PE2 advertise Ethernet A-D route per ES, to withdraw ES-1, to all other PEs. Other PEs, such as PES, may switch routes (such as MAC entries) associated with the Ethernet segment such as ES-1 corresponding to the edge device such as CE1 of the second network to the corresponding substitution Ethernet segment such as ES-2 of the second network. In case CE1 is single-homed to PE1, with such failure, PE1 advertises the corresponding MAC/IP routes withdrawal and the corresponding substitution Ethernet segment to all other PEs. Other PEs, such as PES, may switch routes (such as the MAC entries) associated with the Ethernet segment such as ES-1 corresponding to the edge device such as CE1 of the second network to the corresponding substitution Ethernet segment such as ES-2 of the second network. If there are aliasing/backup paths towards ES-1, for example, only the link between CE1 and PE1 is failed but the link between CE1 and PE2 is available, other PEs will switchover the corresponding traffic to the path towards the Ethernet segment following EVPN aliasing/backup behavior. In this case, the ES substitution may be not triggered. In addition, if there is no next-hop change, for example, when ES-3 has been changed to ES-4 and the next-hop adjacencies for ES-3 and ES-4 are the same, the update procedure in data path can be bypassed.

In an embodiment, the first message may further include a relationship of the Ethernet segment corresponding to the edge device of the second network and the corresponding substitution Ethernet segment of the second network. The relationship may be indicated in various ways such as a bit. The relationship may be used by the edge devices of the first network receiving the first message to handle the case of link or node failure.

In an embodiment, the edge device of the second network may be connected to one or more edge devices of the first network via a set of links. The set of links may include any suitable number of links such as 2 or more links. For example, as shown in FIG. 1, the edge device such as CE1 of the second network may be connected to one or more edge devices such as PE1 and PE2 of the first network via two links.

Figure 5:
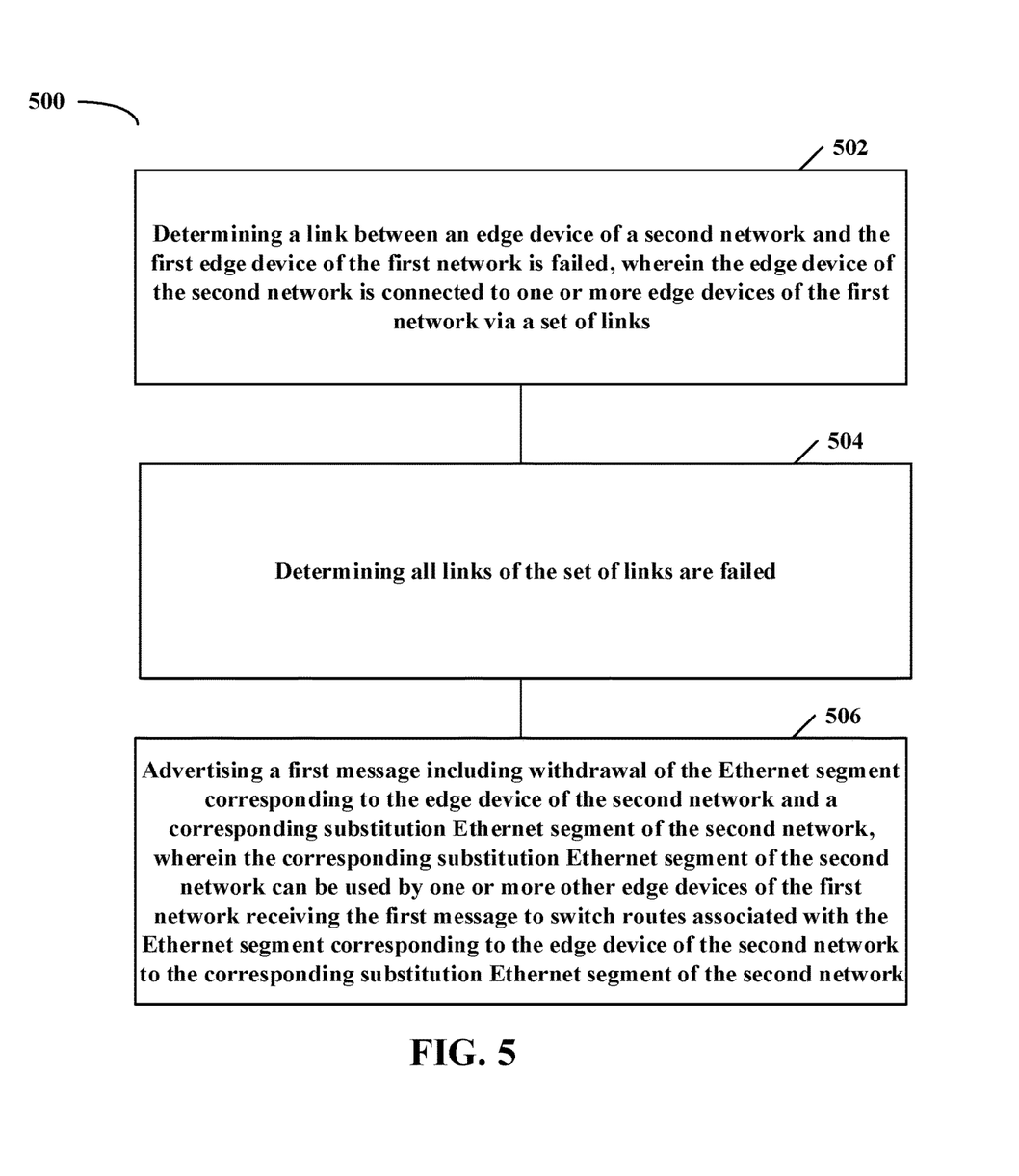
FIG. 5 shows a flowchart of a method according to another embodiment of the present disclosure.

FIG. 5 shows a flowchart of a method 500 according to another embodiment of the present disclosure, which may be implemented at a first edge device of a first network such as PE device of EVPN as shown in FIG. 1. As such, the first edge device may provide means for accomplishing various parts of the method 500 as well as means for accomplishing other processes in conjunction with other components. For some parts which have been described in the above embodiments, detailed description thereof is omitted here for brevity.

At block 502, the first edge device determines a link between an edge device of a second network and the first edge device of the first network is failed. In this embodiment, the edge device of the second network may be connected to one or more edge devices of the first network via a set of links.

At block 504, the first edge device determines all links of the set of links are failed. For example, other edge devices belong to the one or more edge devices of the first network may notify their associated link failure to the first edge device. Alternatively the first edge device may request this information from other edge devices belonging to the one or more edge devices of the first network. For example, as shown in FIG. 2, when the links between CE1 and PE1, PE2 are failed, PE1 and PE2 may notify this failure information to each other.

At block 506, the first edge device advertises a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of the second network to the corresponding substitution Ethernet segment of the second network. Block 506 is similar to block 404.

Figure 6:
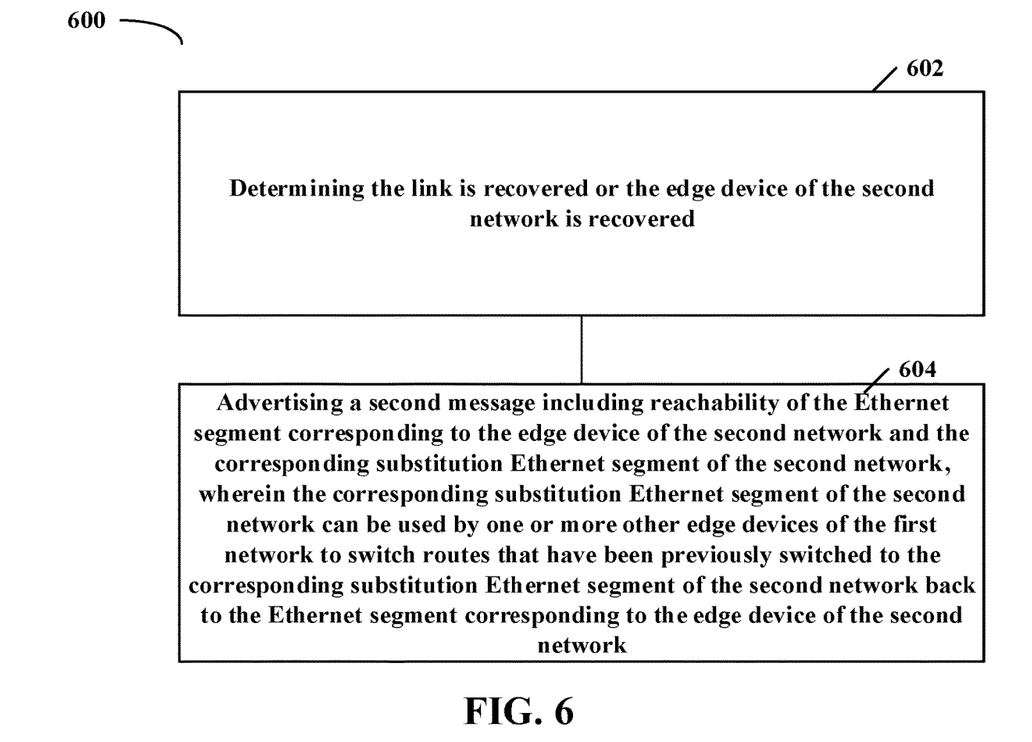
FIG. 6 shows a flowchart of a method according to another embodiment of the present disclosure.

FIG. 6 shows a flowchart of a method 600 according to another embodiment of the present disclosure, which may be implemented at a first edge device of a first network such as PE device of EVPN as shown in FIG. 1. As such, the first edge device may provide means for accomplishing various parts of the method 600 as well as means for accomplishing other processes in conjunction with other components. For some parts which have been described in the above embodiments, detailed description thereof is omitted here for brevity.

At block 602, the first edge device determines the link is recovered or the edge device of the second network is recovered. The link and the edge device of the second network are same as those described in the block 402 of FIG. 4. The first edge device may determine the link is recovered or the edge device of the second network is recovered in various ways. For example, the first edge device may receive a heartbeat message or other message from the edge device of the second network, and then the first edge device may determine the link is recovered or the edge device of the second network is recovered.

At block 604, the first edge device advertises a second message including reachability of the Ethernet segment corresponding to the edge device of the second network and the corresponding substitution Ethernet segment of the second network. The Ethernet segment corresponding to the edge device of the second network and the corresponding substitution Ethernet segment of the second network are same as those as described in block 404 of FIG. 4. The corresponding substitution Ethernet segment of the second network can be used by one or more other edge devices of the first network to switch routes that have been previously switched to the corresponding substitution Ethernet segment of the second network back to the Ethernet segment corresponding to the edge device of the second network.

In an embodiment, the second message may further include a relationship of the Ethernet segment corresponding to the edge device of the second network and the corresponding substitution Ethernet segment of the second network. The relationship may be used by the edge devices of the second network receiving the second message to handle the case of link or node recovery.

In an embodiment, the corresponding substitution Ethernet segment of the second network may be encoded in a Border Gateway Protocol (BGP) path attribute or an extended community. For example, in EVPN, the BGP path attribute or the extended community may use ESI or an equivalent value, e.g. ESI label for MPLS-based EVPN, to identify the Ethernet segment. For example, an example second message including Ethernet A-D route per ES with reverting information using Extended Community may be as following:

Path Attribute—ORIGIN: IGP
Path Attribute—AS_PATH: empty
Path Attribute— . . .
Path Attribute—MP_REACH_NLRI
   AFI=L2VPN/SAFI=EVPN
   Ethernet A-D Route
      RD=PE1_loopback: 0
      ESI=ES-1
      Ethernet Tag=MAX-ET
      MPLS label=0
   Next-hop=PE1_loopback
Path Attribute—EXTENDED_COMMUNITIES
   Route Target=EVI-1
   EVPN ESI
      Mode=All-active
      ESI label=label-1 (ES-1)
   EVPN ESI Substitution
      ESI label=label-2 (ES-2)

In an embodiment, the first network may be an Ethernet virtual private network such as EVPN and the second network may be an Ethernet network.

In an embodiment, the Ethernet network may use Ethernet Ring Protection (ERP) control process as described in ITU-T G.8032/Y.1344.

In an embodiment, the Ethernet ring may be operated in a revertive mode as described in ITU-T G.8032/Y.1344.

Figure 7:
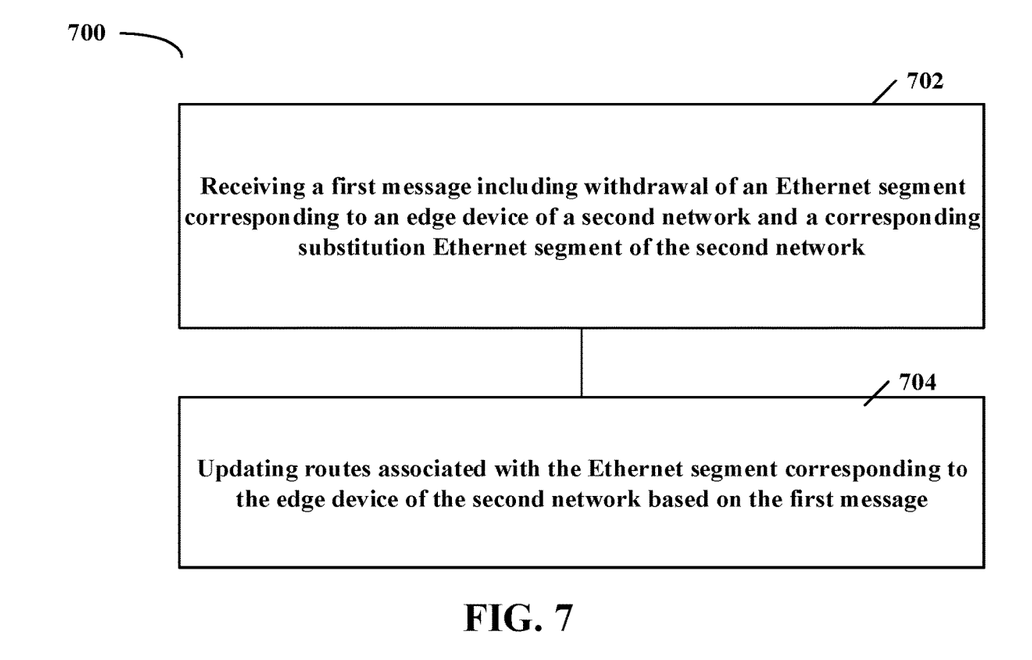
FIG. 7 shows a flowchart of a method according to another embodiment of the present disclosure.

FIG. 7 shows a flowchart of a method 700 according to another embodiment of the present disclosure, which may be implemented at a second edge device of a first network such as PE device of EVPN as shown in FIG. 1. As such, the second edge device may provide means for accomplishing various parts of the method 700 as well as means for accomplishing other processes in conjunction with other components. For some parts which have been described in the above embodiments, detailed description thereof is omitted here for brevity.

At block 702, the second edge device receives a first message including withdrawal of an Ethernet segment corresponding to an edge device of a second network and a corresponding substitution Ethernet segment of the second network. For example, the first edge device may advertise a first message including withdrawal of the Ethernet segment corresponding to the edge device of the second network and a corresponding substitution Ethernet segment of the second network at block 404 of FIG. 4, and then the second edge device such as PE may receive the first message.

At block 704, the second edge device updates routes associated with the Ethernet segment corresponding to the edge device of the second network based on the first message. For example, if there are aliasing/backup paths towards the Ethernet segment corresponding to the edge device of the second network, the second edge device may switchover the routes associated with the Ethernet segment corresponding to the edge device of the second network to the aliasing/backup paths. In this case, the ES substitution may be not triggered. If there is no next-hop change, for example, when an identifier of an Ethernet segment corresponding to the edge device of the second network has been changed to a corresponding substitution Ethernet segment of the second network and the next-hop adjacencies for these Ethernet segments are the same, the update procedure in data path can be bypassed. In addition, when there is no an aliasing/backup path towards the Ethernet segment corresponding to the edge device of the second network, the second edge device may switch the routes associated with the Ethernet segment corresponding to the edge device of the second network to the corresponding substitution Ethernet segment of the second network. The second edge device may record the switched routes which can be used in the recovery process described below.

Figure 8:
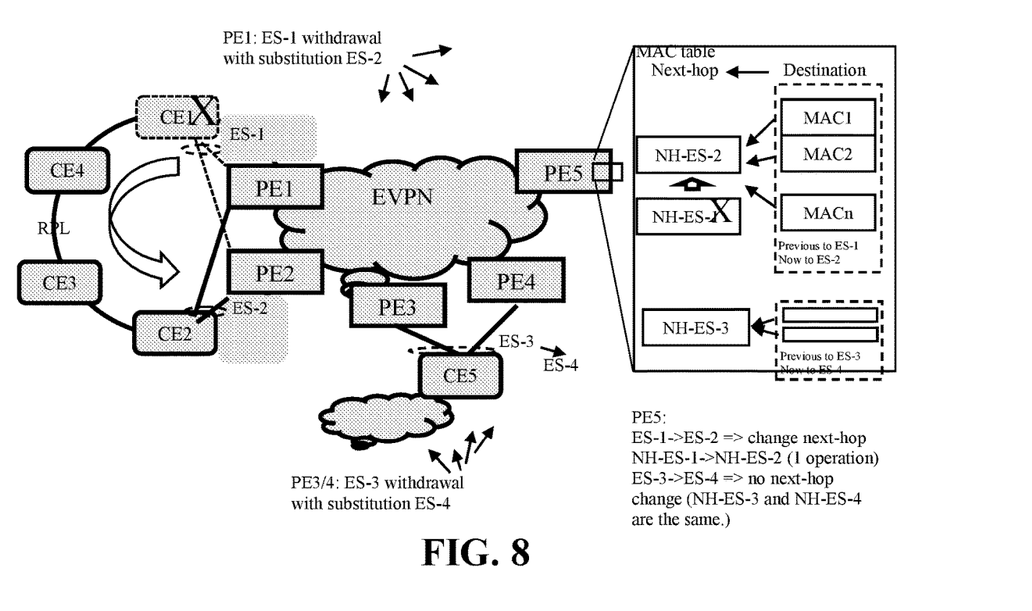
FIG. 8 schematically shows a network of EVPN interworking with ERP according to an embodiment of the present disclosure.

FIG. 8 schematically shows a network of EVPN interworking with ERP according to an embodiment of the present disclosure. As depicted in FIG. 8, CE1 is failed and ES-3 has been changed to ES-4. ES-2 is the substitution for ES-1, while ES-4 is the substitution for ES-3. When PE1 and PE2 advertise ES-1 withdrawal, they attach the ES substitution ES-2. Similarly when PE3 and PE4 advertise ES-3 withdrawal, they attach the ES substitution ES-4. The relationship of ESI withdrawal and its substitution shall also be advertised in ES reachability advertisement, to handle the case of PE node failure. The ES substitution can be encoded in a new path attribute or a new extended community, using ESI or an equivalent value, e.g. ESI label for MPLS-based EVPN, to identify the ES. When other PEs receive the ES withdrawal (e.g. ES-1) together with ES substitution (e.g. ES-2), if no other aliasing/backup paths towards that ES (e.g. ES-1), next-hop adjacencies for all MAC entries associated with the ES (e.g. ES-1) are updated to the ones of the ES substitution (e.g. ES-2) accordingly based on Ethernet A-D route per EVI (EVI is an EVPN instance spanning the Provider Edge (PE) devices participating in that EVPN), instead of invalidating all the MAC entries. If there are still aliasing/backup paths towards that ES, for example, only CE1-PE1 link failure but CE1-PE2 link is available, other PEs will switchover traffic toward ESI related to the CE1-PE1 link to the path (e.g., CE1-PE2 link) following EVPN aliasing/backup behavior. The ES substitution is not triggered. In addition if no next-hop change, for example, when ES-3 has been changed to ES-4 and the next-hop adjacencies for two ES s are the same, the update procedure in data path can be bypassed.

Figure 9:
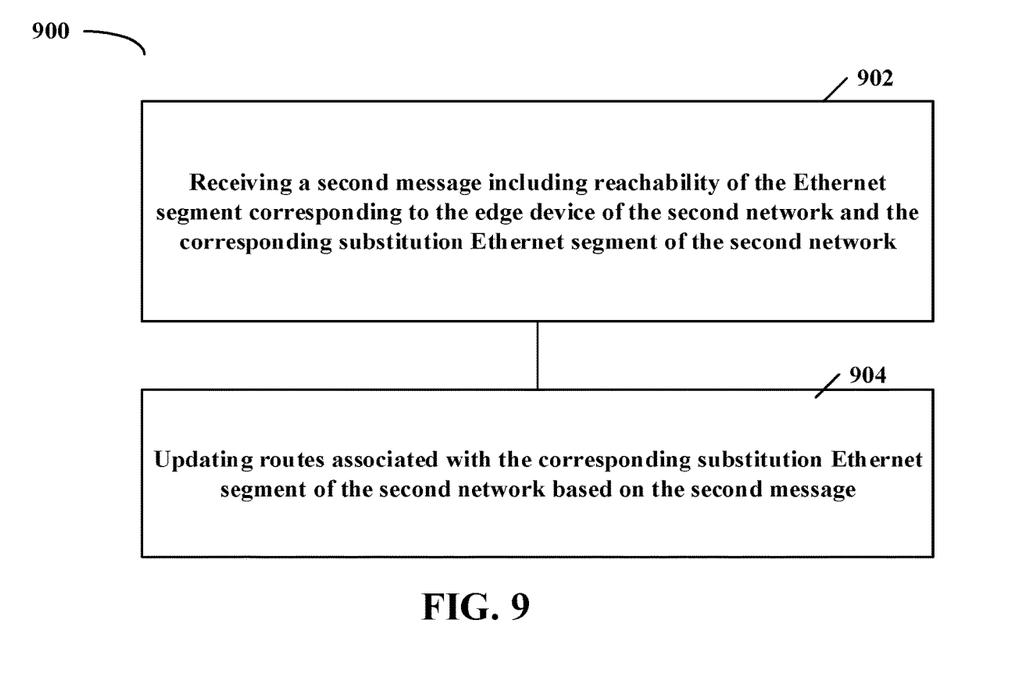
FIG. 9 shows a flowchart of a method according to another embodiment of the present disclosure.

FIG. 9 shows a flowchart of a method 900 according to another embodiment of the present disclosure, which may be implemented at a second edge device of a first network such as PE device of EVPN as shown in FIG. 1. As such, the second edge device may provide means for accomplishing various parts of the method 900 as well as means for accomplishing other processes in conjunction with other components. For some parts which have been described in the above embodiments, detailed description thereof is omitted here for brevity.

At block 902, the second edge device receives a second message including reachability of the Ethernet segment corresponding to the edge device of the second network and the corresponding substitution Ethernet segment of the second network. For example, the first edge device may advertise the second message at block 604 of FIG. 6, and then the second edge device such as PE may receive the second message.

At block 904, the second edge device updates routes associated with the corresponding substitution Ethernet segment of the second network based on the second message. For example, the second edge device may switch routes that have been previously switched to the corresponding substitution Ethernet segment of the second network back to the Ethernet segment corresponding to the edge device of the second network.

Figure 10:
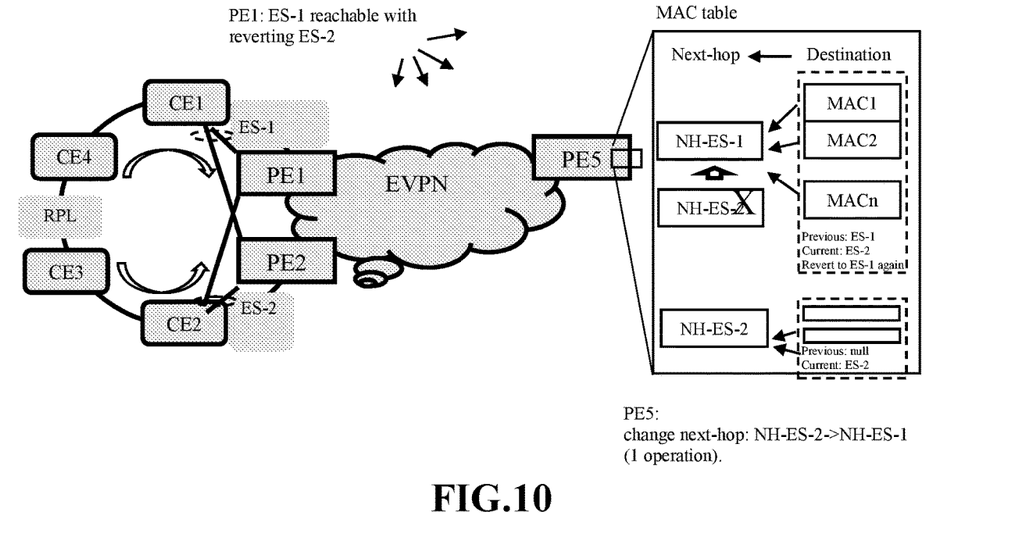
FIG. 10 schematically shows a network of EVPN interworking with ERP according to another embodiment of the disclosure.

FIG. 10 schematically shows a network of EVPN interworking with ERP according to another embodiment of the disclosure. As depicted in FIG. 10, CE1 node is recovered and ES-2 is the substitution information for ES-1. If ERP is not in revertive mode, the substitution information is absent. When PE1 and PE2 advertise the ES-1 reachability, it attaches the ES substitution information if ready. The relationship of ES reachability and its substitution information can also be advertised in ES withdrawal advertisement but not mandatory. The ES substitution information can be encoded in a new path attribute or a new extended community, using ESI or an equivalent value, e.g. ESI label for MPLS-based EVPN, to identify the ES. When other PEs receive the ES reachability (e.g. ES-1) together with ES substitution information (e.g. ES-2), next-hop adjacencies for all MAC entries which switched from ES-1 to ES-2 are switched back to the ones of the ES-1 accordingly based on Ethernet A-D route per EVI, instead of waiting for MAC entries aging out or refresh. In a typical EVPN implementation, the MAC entries are organized by per <ESI> or per <ESI, Ethernet Tag ID> to pointing to a next-hop adjacency. To support the proposed solution, the MAC entries shall be organized by per <ESI pair> or per <ESI pair, Ethernet Tag ID>, where ESI pair is the combination of the previous & current ESIs.

Figure 11:
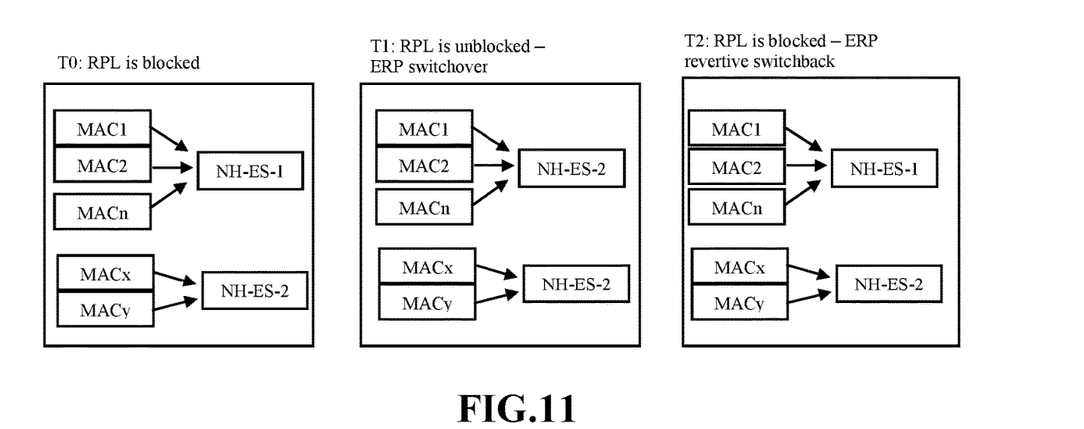
FIG. 11 schematically shows MAC table changes at different timeslots on the second edge device of the first network according to an embodiment of the disclosure

FIG. 11 schematically shows MAC table changes at different timeslots on the second edge device of the first network according to an embodiment of the disclosure. In this embodiment, the second edge device is a PE of a network of EVPN interworking with ERP. At time T0, no CE or link is failed and PRL is blocked. The next hop for MAC1, 2 and n is NH-ES-1 and the next hop for MACx and y is NH-ES-2. At time T1, the CE corresponding to the NH-ES-1 is failed and PRL is unblocked. With the proposed solution, the next hop for MAC1, 2 and n is switched to NH-ES-2 and the next hop for MACx and y is still NH-ES-2. At time T2, the CE corresponding to the NH-ES-1 is recovered and PRL is blocked. With the proposed solution, the next hop for MAC1, 2 and n is switched back to NH-ES-1 and the next hop for MACx and y is still NH-ES-2.

The proposed solution according to some embodiments may have the following advantages. For example, the proposed solution can support incremental deployment. For example, when the edge devices such as PEs of the first network with/without this solution support coexist together, the ones without this solution support silently ignore the information of ES substitution but just process as usual, the ones with this solution support can accommodate optimized traffic convergence. As no impacts on already deployed edge devices such as PEs of the first network, this solution can be deployed incrementally. The proposed solution can implement traffic fast convergence. The proposed solution can implement low cost such as support of add-on feature, control plane change only, no extra data path capability required.

Figure 12:
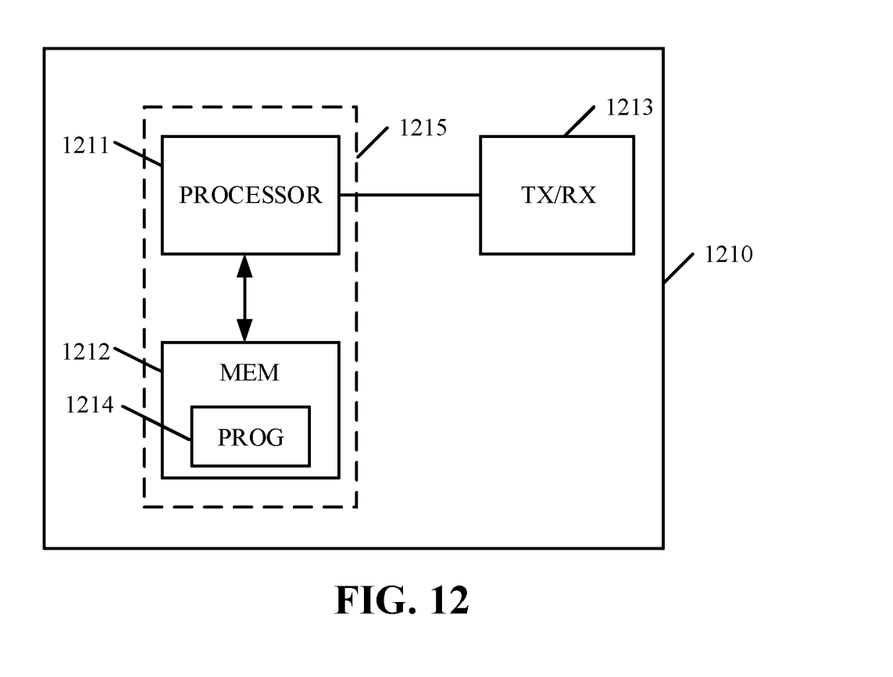
FIG. 12 illustrates a simplified block diagram of an apparatus according to an embodiment of the present disclosure.

FIG. 12 illustrates a simplified block diagram of an apparatus 1210 that may be embodied in/as the first edge device of the first network according to an embodiment of the present disclosure.

The apparatus 1210 may comprise at least one processor 1211, such as a data processor (DP) and at least one memory (MEM) 1212 coupled to the processor 1211. The apparatus 1210 may further comprise a transmitter TX and receiver RX 1213 coupled to the processor 1211. The MEM 1212 stores a program (PROG) 1214. The PROG 1214 may include instructions that, when executed on the associated processor 1211, enable the apparatus 1210 to operate in accordance with the embodiments of the present disclosure, for example to perform any of the methods related to the first edge device of the first network. A combination of the at least one processor 1211 and the at least one MEM 1212 may form processing means 1215 adapted to implement various embodiments of the present disclosure.

Figure 13:
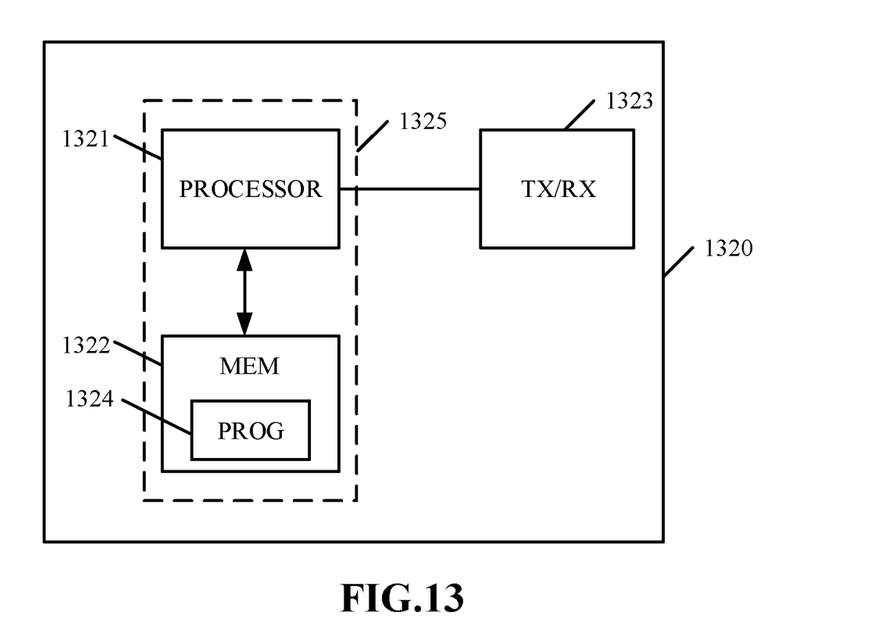
FIG. 13 illustrates a simplified block diagram of an apparatus according to another embodiment of the present disclosure.

FIG. 13 illustrates a simplified block diagram of an apparatus 1320 that may be embodied in/as the second edge device of the first network according to an embodiment of the present disclosure.

The apparatus 1320 may comprise at least one processor 1321, such as a data processor (DP) and at least one memory (MEM) 1322 coupled to the processor 1321. The apparatus 1320 may further comprise a transmitter TX and receiver RX 1323 coupled to the processor 1321. The MEM 1322 stores a program (PROG) 1324. The PROG 1324 may include instructions that, when executed on the associated processor 1321, enable the apparatus 1320 to operate in accordance with the embodiments of the present disclosure, for example to perform any of the methods related to the second edge device of the first network. A combination of the at least one processor 1321 and the at least one MEM 1322 may form processing means 1325 adapted to implement various embodiments of the present disclosure.

Various embodiments of the present disclosure may be implemented by computer program executable by one or more of the processors 1211, 1321, software, firmware, hardware or in a combination thereof.

The MEMs 1212 and 1322 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 1211 and 1321 may be of any type suitable to the local technical environment, and may include one or more of general purpose computers, special purpose computers, microprocessors, digital signal processors DSPs and processors based on multicore processor architecture, as non-limiting examples.

Figure 14:
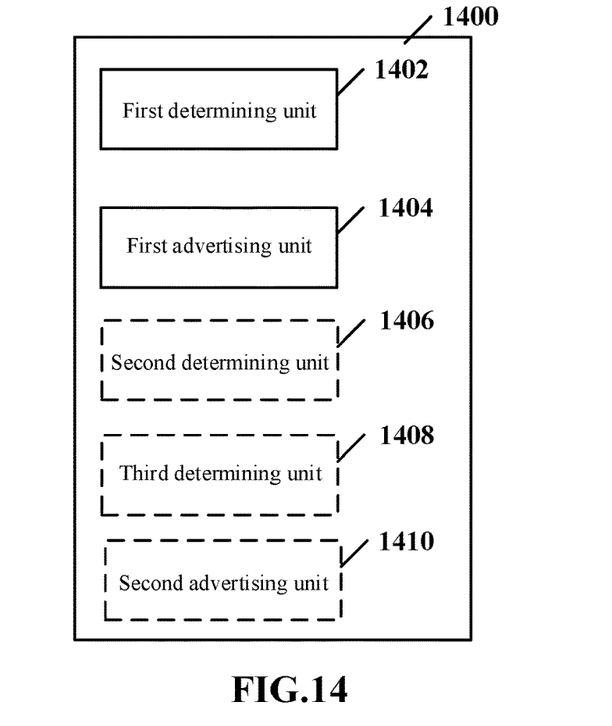
FIG. 14 illustrates a simplified block diagram of an apparatus according to another embodiment of the present disclosure.

Reference is now made to FIG. 14, which illustrates a schematic block diagram of an apparatus 1400 implemented as/at the first edge device of the first network. The apparatus 1400 is operable to carry out any of the exemplary methods related to the first edge device of the first network and possibly any other processes or methods.

As shown in FIG. 14, the apparatus 1400 may comprise a first determining unit 1402 configured to determine a link between an edge device of a second network and the first edge device of the first network is failed or the edge device of the second network is failed or an identifier of an Ethernet segment corresponding to the edge device of the second network has been changed; and a first advertising unit 1404 configured to advertise a first message including withdrawal of the Ethernet segment corresponding to the edge device of the second network and a corresponding substitution Ethernet segment of the second network. The corresponding substitution Ethernet segment of the second network can be used by one or more other edge devices of the first network receiving the first message to switch routes associated with the Ethernet segment corresponding to the edge device of the second network to the corresponding substitution Ethernet segment of the second network.

In an embodiment, the apparatus 1400 may further comprise a second determining unit (optional) 1406 configured to determine all links of the set of links are failed.

In an embodiment, the apparatus 1400 may further comprise a third determining unit (optional) 1408 configured to determine the link is recovered or the edge device of the second network is recovered; and a second advertising unit 1410 configured to advertise a second message including reachability of the Ethernet segment corresponding to the edge device of the second network and the corresponding substitution Ethernet segment of the second network, wherein the corresponding substitution Ethernet segment of the second network can be used by one or more other edge devices of the first network to switch routes that have been previously switched to the corresponding substitution Ethernet segment of the second network back to the Ethernet segment corresponding to the edge device of the second network.

Figure 15:
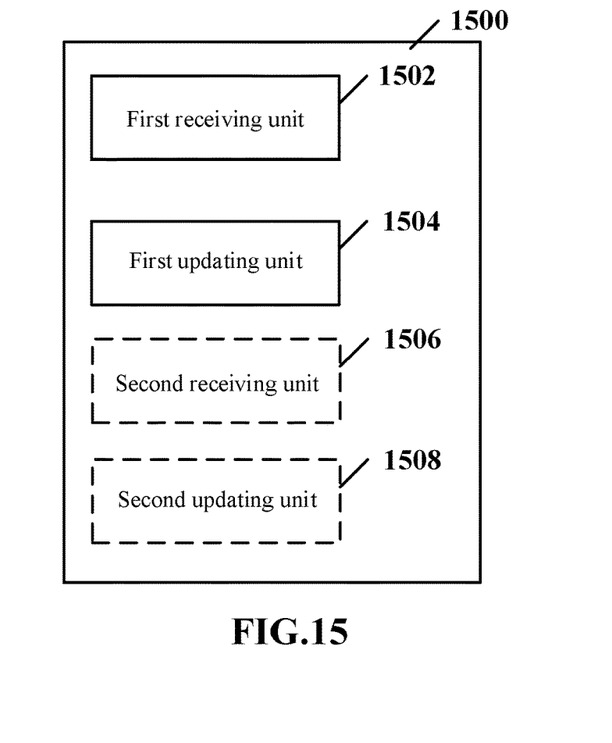
FIG. 15 illustrates a simplified block diagram of an apparatus according to another embodiment of the present disclosure.

Reference is now made to FIG. 15, which illustrates a schematic block diagram of an apparatus 1500 implemented as/at the first edge device of the first network. The apparatus 1500 is operable to carry out any of the exemplary methods related to the second edge device of the first network and possibly any other processes or methods.

As shown in FIG. 15, the apparatus 1500 may comprise a first receiving unit 1502 configured to receive a first message including withdrawal of an Ethernet segment corresponding to an edge device of a second network and a corresponding substitution Ethernet segment of the second network; and a first updating unit 1504 configured to update routes associated with the Ethernet segment corresponding to the edge device of the second network based on the first message.

In an embodiment, the apparatus 1500 may further comprise a second receiving unit (optional) 1506 configured to receive a second message including reachability of the Ethernet segment corresponding to the edge device of the second network and the corresponding substitution Ethernet segment of the second network; and a second updating unit (optional) 1508 configured to update routes associated with the corresponding substitution Ethernet segment of the second network based on the second message.

According to an aspect of the disclosure it is provided a computer program product being tangibly stored on a computer readable storage medium and including instructions which, when executed on at least one processor, cause the at least one processor to carry out any of the methods related to the first edge device of the first network as described above.

According to an aspect of the disclosure it is provided a computer-readable storage medium storing instructions which when executed by at least one processor, cause the at least one processor to carry out any of the methods related to the first edge device of the first network as described above.

According to an aspect of the disclosure it is provided a computer program product being tangibly stored on a computer readable storage medium and including instructions which, when executed on at least one processor, cause the at least one processor to carry out any of the methods related to the second edge device of the first network as described above.

According to an aspect of the disclosure it is provided a computer-readable storage medium storing instructions which when executed by at least one processor, cause the at least one processor to carry out carry out any of the methods related to the second edge device of the first network as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a first edge device of a first network, the method comprising the first edge device:
   determining a link between an edge device of a second network and the first edge device of the first network is failed, or the edge device of the second network is failed, or an identifier of an Ethernet segment corresponding to the edge device of the second network has been changed;
   advertising a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of the second network to the corresponding substitution Ethernet segment of the second network;
   determining the link is recovered or the edge device of the second network is recovered; and
   advertising a second message including reachability of the Ethernet segment corresponding to the edge device of the second network and the corresponding substitution Ethernet segment of the second network, wherein the corresponding substitution Ethernet segment of the second network can be used by one or more other edge devices of the first network to switch routes that have been previously switched to the corresponding substitution Ethernet segment of the second network back to the Ethernet segment corresponding to the edge device of the second network.

2. The method of claim 1, wherein the edge device of the second network is connected to one or more edge devices of the first network via a set of links.

3. The method of claim 2, further comprising determining all links of the set of links are failed.

4. The method of claim 1, wherein the first message further includes a relationship of the Ethernet segment corresponding to the edge device of the second network and the corresponding substitution Ethernet segment of the second network.

5. The method of claim 1, wherein the second message further includes a relationship of the Ethernet segment corresponding to the edge device of the second network and the corresponding substitution Ethernet segment of the second network.

6. The method of claim 1, wherein the corresponding substitution Ethernet segment of the second network is configured in the first edge device of the first network or derived by the first edge device of the first network.

7. The method of claim 1, wherein the corresponding substitution Ethernet segment of the second network is encoded in a Border Gateway Protocol (BGP) path attribute or an extended community.

8. The method of claim 1, wherein the first network is an Ethernet virtual private network and the second network is an Ethernet network.

9. The method of claim 8, wherein the Ethernet network uses an Ethernet Ring Protection (ERP) control process.

10. The method of claim 9, wherein an Ethernet ring of the Ethernet network is operated in a revertive mode.

11. The method of claim 1, wherein the identifier of an Ethernet segment of the second network is an Ethernet segment identifier (ESI).

12. An apparatus at a first edge device of a first network, the apparatus comprising:
    processing circuitry;
    memory containing instructions executable by the processing circuitry whereby the apparatus is operative to:
       determine a link between an edge device of a second network and the first edge device of the first network is failed, or the edge device of the second network is failed, or an identifier of an Ethernet segment corresponding to the edge device of the second network has been changed;
       advertise a first message including withdrawal of the Ethernet segment corresponding to the edge device of the second network and a corresponding substitution Ethernet segment of the second network, wherein the corresponding substitution Ethernet segment of the second network can be used by one or more other edge devices of the first network receiving the first message to switch routes associated with the Ethernet segment corresponding to the edge device of the second network to the corresponding substitution Ethernet segment of the second network;
       determine that the link is recovered or the edge device of the second network is recovered; and
       advertise a second message including reachability of the Ethernet segment corresponding to the edge device of the second network and the corresponding substitution Ethernet segment of the second network, wherein the corresponding substitution Ethernet segment of the second network can be used by one or more other edge devices of the first network to switch routes that have been previously switched to the corresponding substitution Ethernet segment of the second network back to the Ethernet segment corresponding to the edge device of the second network.

13. The apparatus of claim 12:
    wherein the edge device of the second network is connected to one or more edge devices of the first network via a set of links; and
    wherein the instructions are such that the apparatus is operative to determine all links of the set of links are failed.

* * * * *